United States Patent [19]

Owen et al.

[11] 3,852,097

[45] Dec. 3, 1974

[54] PROCESS FOR TREATING SURFACES

[75] Inventors: William John Owen, Sully; Bryan Ewart Cooper, Bridgend; Stephen Westall, Barry, Glamorgan, all of Wales

[73] Assignee: Dow Corning Limited, London, England

[22] Filed: Feb. 8, 1973

[21] Appl. No.: 330,560

[52] U.S. Cl.. 117/93.31, 106/287 SB, 117/138.8 G, 117/138.8 F, 117/138.8 N, 117/138.8 E, 117/138.8 UA, 117/139, 117/145, 260/45.6 E, 260/45.6 Y, 260/448.2 B, 260/448.2 N

[51] Int. Cl............................................. B44d 1/50

[58] Field of Search............ 117/138.8 A, 138.8 F, 117/138.8 N, 138.8 E, 161 ZA, 139, 155 R; 260/46.5 P, 46.5 E, 46.5 Y, 448.2 B, 448.2 N, 260/824 R, 825; 106/287 SB

[56] References Cited
UNITED STATES PATENTS

| | | | |
|---|---|---|---|
| 3,227,579 | 1/1966 | Bluestein | 117/161 |
| 3,320,088 | 5/1967 | Feild | 117/138.8 |
| 3,369,009 | 2/1968 | MacArthur | 260/80.81 |
| 3,530,092 | 9/1970 | Borchert | 260/46.5 |
| 3,655,420 | 4/1972 | Tichenor | 117/138.8 EA |
| 3,706,592 | 12/1972 | Thomson | 117/72 |

Primary Examiner—Ralph S. Kendall
Assistant Examiner—P. E. Willis
Attorney, Agent, or Firm—Robert F. Fleming

[57] ABSTRACT

A process for treating the surface of a solid organic polymer to provide e.g. durable water repellency, lubricant or release properties. The organic polymer is first coated with an organosiloxane containing azidoformate substituents and the applied coating is then exposed to high energy radiation, ultra-violet light or a temperature in excess of 80°C.

8 Claims, No Drawings

PROCESS FOR TREATING SURFACES

This invention relates to a process for treating surfaces to impart thereto water repellency or other desirable properties.

It is known that organopolysiloxanes may be applied to solid surfaces, for example, textiles, paper and plastics, to render the surfaces water repellent or nonadhesive or to impart lubricity thereto. The most commonly employed organopolysiloxanes for this purpose are the polydimethylsiloxanes or mixtures of these with methylhydrogen polysiloxanes. Whilst the polydimethylsiloxanes produce the desired surface properties they often lack adequate durability and can be removed, for example, when subjected to laundering or contact with organic solvents.

A method of obtaining durable surface lubricity and other properties in organic polymers is described in U.K. Pat. No. 1,257,304. Said method, however, requires the incorporation of certain siloxane-organic block copolymers into the polymer bulk and therefore can not be employed in the treatment of articles which have achieved their final shaped state. This invention relates to a process whereby the surfaces of certain solid, organic materials may be endowed with an organopolysiloxane surface coating having improved durability to solvents and abrasion.

According to this invention there is provided a process for treating a surface of a solid organic polymer containing less than 12 per cent by weight of hydroxyl radicals and at least one carbon to hydrogen bond and/or olefinically unsaturated linkage which comprises (1) applying to said surface a coating of an organosiloxane having in the molecule at least one unit of the general formula

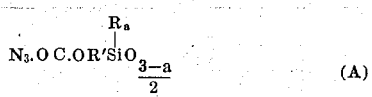

(A)

and at least one unit of the general formula $$R''_b SiO_{4-b/2}$$

(B)

wherein each R and each R'' represents a hydrogen atom or a monovalent hydrocarbon or halogenated hydrocarbon radical having less than 19 carbon atoms, R' represents a divalent aliphatic radical having from 1 to 12 inclusive carbon atoms and composed of carbon, hydrogen and optionally oxygen and sulphur, any oxygen being present in the form of ether linkages, in

groups or in

groups and any sulphur being present as sulphide —CSC— groups, a is 0, 1 or 2 and b is 1, 2 or 3, there being present in the organosiloxane at least 1 mol per cent of (A) units, and (2) exposing the applied organosiloxane to one or more of high energy radiation, ultra violet light and a temperature in excess of 80°C.

Also included within the scope of this invention is an article comprising a solid, organic polymer which has been treated according to said process.

In the general formulae of the siloxane units each R and each R'' may be the same or different in any given molecule and may represent a hydrogen atom, or a monovalent hydrocarbon or halogenated hydrocarbon radical having less than 19 carbon atoms. Examples of such radicals are alkyl and cycloalkyl radicals e.g. methyl, ethyl, propyl, n-butyl, octyl, tetradecyl, octadecyl and cyclohexyl, alkenyl radicals e.g. vinyl and allyl, aryl, aralkyl and alkaryl radicals e.g. phenyl, benzyl and tolyl, and halogenated hydrocarbon radicals e.g. chloromethyl, bromophenyl and 3,3,3-trifluoropropyl.

Examples of the divalent aliphatic radical R' are —CH$_2$—, CH$_2$CH$_2$—, —(CH$_2$)$_3$—, —CH$_2$CHCH$_3$CH$_2$—, —(CH$_2$)$_3$OCH$_2$CH$_2$—, —(CH$_2$)$_{11}$—, —(CH$_2$)$_2$S(CH$_2$)$_3$,

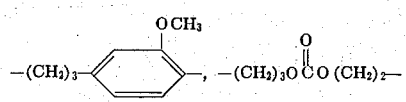

and

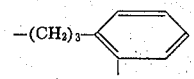

Preferably R' is —(CH$_2$)$_3$— or —CH$_2$CHCH$_3$—.

The organosiloxanes employed in the process of this invention may range in molecular weight from the disiloxane comprising one unit of each specified type in which a is 2, and b is 3, to high molecular weight copolymers containing many of the organosiloxane units. Depending on the functionality and relative proportions of the siloxane units present the organosiloxanes may vary from mobile liquids to gums or organic solvent-soluble resins. For example, the organosiloxane may have a linear configuration and consist of one or more units (A) wherein a is 1 end-stopped with units (B) wherein b is 3. In another linear configuration the organosiloxane may consist of one or more units (B) wherein b is 2 end-stopped with units (A) wherein a is 2. When desired, branching may be incorporated into the copolymer employing units (A) wherein a is 0 or units (B) wherein b is 1. In addition to units (A) and (B) the organosiloxane may contain up to 10 mol per cent of tetrafunctional, that is, SiO$_2$ units.

The units (A) and (B) may be present in widely varying relative proportions. At least 1 mol per cent of (A) units should be present in the organosiloxane. Relatively high proportions, i.e. more than about 70 mol per cent of (A) units may be used. However, the use of such high proportions increases the cost of the process without conferring a commensurate increase in durability. For most organic polymer substrates, particularly the hydrocarbon polymers, we prefer to employ organosiloxanes having from 5 to 20 mol per cent of (A) units and from 95 to 80 mol per cent of (B) units. When the organic polymer contains elements in addition to carbon and hydrogen and is also free of olefinic unsaturation higher proportions, i.e. from about 10 to 50 mol per cent, of (A) units may be required for optimum results.

Preferably the organosiloxanes employed herein have molecular weights within the range from 1,000 to 1,000,000. In view of the wide commercial applicability and availability of the methyl-substituted polysiloxanes it is further preferred that at least 50 per cent of the total R and R'' substituents in the organosiloxane are methyl radicals.

The organosiloxanes employed in the process of this invention may be prepared by several methods. For example they can be prepared by the addition of an unsaturated azidoformate e.g. $CH_2\!\!=\!\!CH.CH_2O.CO.N_3$ to an organosiloxane containing silicon-bonded hydrogen atoms. This reaction may be performed in the presence of a hydrosilylation catalyst. Such catalysts are well-known in the art and in include, for example, chloroplatinic acid and other platinum metal compounds and complexes. In view of the hazardous nature of some of the unsaturated azidoformates a more preferred route to the azidoformate-substituted siloxanes comprises reacting the corresponding siloxane containing silicon-bonded chloroformate ($-R'$ O.CO.Cl) substituents with sodium azide. This reaction can be carried out in a suitable organic solvent, for example dimethoxyethane. Alternatively the sodium azide can be employed in aqueous solution and the siloxane as a solution in an organic solvent, e.g. diethyl ether, which is partly miscible with water.

Another method of preparing the organosiloxanes comprises the cohydrolysis of the corresponding hydrolysable azidoformate-substituted silanes and R'' substituted silanes under substantually neutral conditions, and condensation of the hydrolysis product. Yet another method comprises reacting a silane containing silicon-bonded azidoformate and methoxy or ethoxy radicals with a siloxane containing silicon-bonded hydroxyl radicals. The azidoformate-substituted silanes may be obtained by substituting the appropriate silanes for the siloxanes in preparative reactions described hereinabove.

The process of this invention may be employed to treat the surface of any solid organic polymer having less than 12 percent by weight hydroxyl content and at least one carbon to hydrogen ( $\equiv$ C —H) bond and/or at least one

group. Examples of such materials are polyolefins, e.g. polyethylene, polypropylene, ethylenepropylene copolymers, vinyl and vinylidene polymers and copolymers e.g. polyvinyl chloride, polyvinylidene chloride, polyvinyl acetate, polyacrylates such as polymethylmethacrylate and polyethylacrylate, polyacrylonitrile and polystyrene, hydrocarbon and halogenated hydrocarbon elastomers, e.g. natural rubber, polybutadiene, polyisoprene, polychloroprene, poly(acrylonitrile-butadiene-styrene) and poly(styrene-butadiene), polyesters e.g. polyethylene terephthalate, polyamides, acrylic resins, epoxy resins, phenol-formaldehyde resins, urea-formaldehyde resins, cellulose acetate and leather.

Any convenient technique may be used to apply the organosiloxane coating to the substrate surface, for example, flooding, brushing, spraying or immersion. The organosiloxane may be applied employing a liquid carrier, for example, as an organic solvent solution or aqueous emulsion. Any suitably volatile organic solvent can be employed, for example benzene, toluene, pentane, white spirit, diethyl ether, acetone or mixtures thereof. When the organosiloxane is itself liquid it may, if desired, be applied without dilution.

The proportion of organosiloxane applied to the surface may vary from an amount which provides a monomolecular layer to that which provides a coating several millimetres thick. In general, however, it is unnecessary and economically disadvantageous to apply heavy coatings and we prefer to employ sufficient of the organosiloxane to provide coatings having thicknesses up to about 0.05 inch.

Following the application of the organosiloxane the treated substrate is exposed to high energy radiation, ultra violet light, a temperature above 80°C or any combination of these. The period of exposure may vary from several seconds to many minutes depending on the energy of the source employed. Any type of high energy ionising radiation may be employed, for example, X-rays, gamma rays and accelerated electrons.

Temperatures from 80°C to just below the decomposition temperature of the organic polymer may be employed. The preferred temperature range is, however, from about 120° to 180°C. Any liquid carrier applied with the organosiloxane should preferably be removed, e.g. by air drying at temperatures below 80°C, prior to exposure of the substrate to the high energy radiation, ultra violet light or temperature above 100°C.

The process of this invention can be employed to provide on a wide variety of organic polymers an organosiloxane coating having improved durability to solvents and abrasion. It thus finds application in the provision of organic polymers having surfaces which exhibit e.g. the properties of hydrophobicity, lubricity and non-adhesion to sticky substances. The process is particularly adapted to the treatment of hydrocarbon polymers, for example, polyolefins and hydrocarbon elastomers.

The following examples illustrate the invention.

EXAMPLE 1.

A trimethylsiloxy end-stopped polydiorganosiloxane (200 g.) having a molecular weight of approximately 2,200 and consisting of 90 mol. per cent of $(CH_3)_2SiO$ units and 10 mole per cent of $OSiCH_3(CH_2)_3O.CO.Cl$ units was dissolved in 800 ml. of 1,2-dimethoxyethane. Sodium azide (20 g., 0.30 mole) was added to the solution and the mixture stirred vigorously for 80 hours at 20°C. The solution was then filtered and the solvent removed under reduced pressure to leave a clear viscous liquid. The i.r. spectrum of this fluid showed an absorption at 1,730 $cm^{-1}$ which is caracteristic of the azidoformate $-O.CO.N_3$ group.

A solution of the organosiloxane (160 g.) in toluene (1000 ml.) was used to treat pieces of nylon and polyethylene terephthalate fabric by padding (mangle expression = 60 percent). The treated fabric was air dried and then heated at 150°C for 5 minutes. Pick-up of organosiloxane by the fabrics was 2 percent by weight.

The durability of the organosiloxane coating was tested by subjecting samples of the treated fabrics to a. five solvent washes, each consisting of agitation of the fabric in perchloroethylene at 20°C for 30 minutes, or
b. five consecutive detergent washes each consisting of agitation of the fabric for 15 minutes in a 0.1 percent by weight solution of an anionic detergent at 40°C.

The water repellency of the fabric as indicated by the spray ratings (A.A.T.C.C. test M22-52) was compared before and after the solvent and detergent washes. The results obtained were as follows:

| | Spray Rating | | |
|---|---|---|---|
| | Initial | After solvent washes | After detergent washes |
| Nylon | 70 – 80 | 60 – 70 | 70 – 80 |
| Terylene | 70 – 80 | 60 – 70 | 70 – 80 |

EXAMPLE 2.

A thin film of the siloxane copolymer prepared in Example 1 was applied both from solution in acetone and undiluted to rigid sheets of polyethylene (ICI XNM 68) and propylene (ICI Propathene). The solvent applied films were allowed to air dry at 20°C. some of the treated surfaces were then exposed to ultra violet radiation from a 300 watt U.V. lamp, the samples being placed 2 inches from the lamp for 5 minutes. Other samples of treated polypropylene were placed in an air circulating oven at 150°C for 5 minutes. On completion of the heat or radiation treatment the samples were subjected to various rigorous organic solvent or water rinsing operations. The critical surface tensions of wetting $O_c$ of the coated samples, and of untreated control samples, were then measured according to the method of Zisman (Advances in Chemistry (43) published by Am. Chem. Soc., pages 1 – 52) and the following results obtained:

| (dyne cm$^{-1}$) | | Critical Surface Tension of Wetting | | | |
|---|---|---|---|---|---|
| | Untreated | No Solvent Rinse | Cold Solvent Wash | Hot Solvent Wash | Water boil |
| Polypropylene 150°C | 22.6 | 18.5 | 18.5(a) | 19.1(b) | 18.6(e) |
| do. U.V. | 22.9 | 19.1 | 19.8(a) | 19.2(b) | — |
| Polyethylene U.V. | 24.4 | 19.7 | 19.3(c) | 19.5(d) | — |

(a). 10 hours agitation in toluene at 20°C
(b). 6 hours reflux in 1,2-dimethoyxethane
(c). 16 hours agitation in acetone at 20°C
(d). 6 hours reflux in acetone
(e). 24 hours immersion in boiling water.

The results indicate that a durable low energy surface characteristic of polydimethylsiloxane was imparted to the polyethylene and polypropylene substrates.

EXAMPLE 3.

An organosiloxane copolymer having the average formula

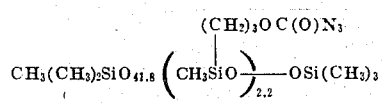

was prepared by the method described in Example 1.

A thin film of the copolymer was applied to a sheet of natural rubber prepared by curing a formulation based smoked sheet and of a type suitable for the fabrication of tyre sidewalls. The copolymer was applied to the surface from a 5 percent by weight solution in diethyl ether and the applied film allowed to air dry at 20°C. The treated surface was then exposed for 5 minutes to a 300 watt ultra violet lamp at a distance of 1.5 inches.

The treated rubber had a smooth glossy finish and an enhanced appearance. Adhesive tape would not adhere to the treated surface. These properties were retained even after rigorous washing of the surface with acetone at 20°C.

When the critical surface tension of wetting was measured according to the procedure of Example 2 the following results were obtained.

| | $\overline{O}_c$ (dyne cm.$^{-1}$) |
|---|---|
| Untreated rubber | 31.0 |
| Surface treated (but not exposed to UV), then washed with acetone | 31.3 |
| Surface treated and exposed to U.V. | 20.5 |
| Treated surface after U.V. exposure and acetone wash | 20.8 |

EXAMPLE 4.

The procedure of Example 3 was repeated using as the substrates:

a. a sheet of neoprene rubber based on Neoprene GRT and having a formulation of the type suitable for general moulding use, and
b. a sheet of styrene-butadiene rubber of the type suitable for tyre sidewalls.

In each case the treated rubber had a smooth glossy finish and was of enhanced appearance. Adhesive tape would not adhere to the treated surfaces. Measurement of the critical surface tension of wetting ($\overline{O}_c$) yielded the following results.

| | Neoprene | Styrene-butadiene |
|---|---|---|
| Untreated rubber | 38.0 dyne cm$^{-1}$ | 33.0 dyne cm$^{-1}$ |
| Rubber treated and exposed to U.V. | 20.9 do. | 20.9 |
| Treated rubber after acetone wash | 21.4 do. | 21.6 |

EXAMPLE 5.

The organosiloxane employed in Example 3 was applied as a 5 percent by weight solution in diethyl ether to a. a film of cellulose acetate
b. polyurethane sheets (Porvair)
c. epoxy resin/glass laminate.

The applied solution was allowed to air dry at 20°C and treated surfaces then exposed to a 300 watt ultraviolet lamp for 5 minutes at a distance of 1.5 inches.

In each case a hydrophobic, non-adherent organosiloxane coating was obtained. The coatings were resistant to solvent washing but were not as durable as those obtained on hydrocarbon polymers e.g. natural rubber or neoprene.

That which is claimed is:

1. A process for treating a surface of a solid organic polymer containing less than 12 per cent by weight of hydroxyl radicals and having at least one chemical linkage selected from carbon to hydrogen bonds and olefinically-unsaturated linkages, said process comprising (1) applying to said surface a coating of an organosiloxane having in the molecule at least one unit of the general formula

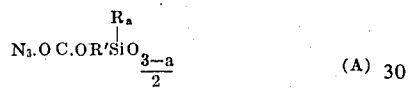  (A)

and at least one unit of the general formula $$R''_b SiO_{4-b/2}$$
(B)

wherein each R and each R'' represents a hydrogen atom or a monovalent hydrocarbon or halogenated hydrocarbon radical having less than 19 carbon atoms, R' represents a divalent aliphatic radical having from 1 to 12 inclusive carbon atoms and composed of carbon and hydrogen a is 0, 1 or 2 and b is 1, 2 or 3, there being present in the organosiloxane at least 1 mol percent of (A) units, and (2) exposing the applied organosiloxane to one or more of high energy radiation, ultra violet light and a temperature from 80°C. to just below the decomposition temperature of the organic polymer.

2. A process as claimed in claim 1 wherein the organo-siloxane has a molecular weight within the range from 1,000 to 1,000,000.

3. A process as claimed in claim 1 wherein at least 50 per cent of the total R and R' substituents in the organosiloxane are methyl radicals.

4. A process as claimed in claim 1 wherein the organosiloxane comprises from 5 to 20 mol per cent of units (A) and from 95 to 80 mol per cent of units (B).

5. A process as claimed in claim 1 wherein R' represents the —(CH$_2$)$_3$— or —CH$_2$CHCH$_3$— radicals.

6. A process as claimed in claim 1 wherein the solid organic polymer is a hydrocarbon polymer.

7. A process as claimed in claim 1 wherein the applied organosiloxane is exposed to a temperature of from 120 to 180°C.

8. The process of claim 1 in which R' also contains oxygen or sulphur, any oxygen being present in the form of ether linkages, in

groups or in

groups any sulphur being present as sulphide —CSC— groups.

* * * * *